United States Patent [19]

Spindler et al.

[11] Patent Number: 4,919,945
[45] Date of Patent: Apr. 24, 1990

[54] USE OF AQUEOUS L-LYSINE SOLUTIONS FOR SUPPLEMENTING FEEDS AND INDISTRIALLY PRODUCED MIXED FEEDS WITH L-LYSINE

[75] Inventors: Manfred Spindler, Kurfürstenstrasse; Herbert Tanner, Wildaustrasse, both of Fed. Rep. of Germany

[73] Assignee: Degussa Aktiengesellschaft, Frankfurt, Fed. Rep. of Germany

[21] Appl. No.: 158,096

[22] Filed: Feb. 16, 1988

Related U.S. Application Data

[63] Continuation of Ser. No. 552,101, Nov. 16, 1983, abandoned.

[30] Foreign Application Priority Data

Nov. 18, 1982 [DE] Fed. Rep. of Germany ....... 3242501

[51] Int. Cl.$^5$ .......................... A23K 1/00; A23K 1/22
[52] U.S. Cl. ......................................... 426/69; 426/74; 426/465; 426/623; 426/630; 426/634; 426/656; 426/807

[58] Field of Search ................... 426/634, 465, 69, 72, 426/74, 623, 630, 656, 807, 641

[56] References Cited

U.S. PATENT DOCUMENTS 3,552,978  1/1971  Inklaar ........................... 426/641 X

OTHER PUBLICATIONS

Morrison "Feeds and Feeding" Morrison Publishing Co (1957) pp. 70–77, 1128–1131 and 1136–1141.

Primary Examiner—R. B. Penland
Attorney, Agent, or Firm—Cushman, Darby & Cushman

[57] ABSTRACT

To supplement feeds and industrially produced mixed feeds with L-lysine, there are used aqueous L-lysine solutions having a L-lysine content between 30 and 80 weight percent, preferably between 50 and 70 weight percent. In comparison with crystallized L-lysine, they are clearly more stable and in equimolar amounts show the same L-lysine activity as the known forms presently offered.

9 Claims, No Drawings

USE OF AQUEOUS L-LYSINE SOLUTIONS FOR SUPPLEMENTING FEEDS AND INDISTRIALLY PRODUCED MIXED FEEDS WITH L-LYSINE

This is a continuation of application Ser. No. 552,101, filed Nov. 16, 1983, which was abandoned upon the filing hereof.

BACKGROUND OF THE INVENTION

The invention is directed to the use of aqueous L-lysine solutions having an L-lysine content between 30 and 80 weight percent for supplementing feeds and industrially produced mixed feeds with L-lysine.

Industrially produced mixed feeds serve particularly as foods for various agriculturally useful animals, such as poultry, swine, and cattle, but also are used as foods for household animals. The feed in each case as a rule contains all the necessary nutrients needed for the corresponding type of animal in weighed and sufficient amounts. There are known various individual feeding (or foddering) agents, e.g., soybean meal, corn, other types of vegetables, post milling products such as corn gluten or corn gluten meal, fish meal, meat meal, fatty feed, molasses, calcium acid phosphate, cattle salt, as well as other components of plant, animal, or mineral origin. Additionally, mixed feeds contain material which are added to improve the nutritional quality of the rations. For this purpose, there can be mentioned aminoacids such as L-lysine as well as minerals, trace elements, and preservatives.

The composition of the mixed feed is subject to changes depending on the supply and price of the components. However, the formula must always be so shaped that the nutrient content corresponds to the requirements of the animals in each case.

The various individual feeding materials and additives first are present as individual components. Depending on their nature, they must be prepared, e.g., by purification, drying, grinding, crushing. If the individual components have the necessary properties, the actual mixing process is carried out in a mixing plant suitable therefor. Thereby, the individual mixing components are different depending on the size of the plant. To produce a homogeneous mixture, there is required a sufficient exactitude in the mixing. For components which are present in the finished mixed feed only in small concentration under certain circumstances the production of a correspondingly more highly concentrated premixture is indispensable. Finished mixed feeds can be employed in the form of meal or also as pellets.

Already for a long time the essential aminoacid L-lysine has been used to a considerable extent as an additive in industrially produced mixed feeds for poultry, swine, and other animals. Thereby, however, there is not employed the crystalline aminoacid L-lysine in pure form since the L-lysine in free form is difficult to crystallize, exhibits strongly hygroscopic properties, absorbs carbon dioxide form the air, has an extremely unpleasant odor, and is inclined to decompose.

Rather, there were employed concentrates which besides the L-lysine formed by fermentation still contain the entire biomass obtained during the fermentation process or at least a part of the biomass (German patent 2357119 or East German patent 139205). In a given case, this type of concentrate also contains mineral additives such as lime, magnesium carbonate, silica, or silicates (German OS 3032618). The actual content of such concentrates of L-lysine accordingly is relatively small.

Therefore, generally for the supplementation of industrially produced mixed fodders with L-lysine, there is used L-lysine monohydrochloride. This monohydrochloride is a stable, easy to crystallize compound which is neither hygroscopic nor has unpleasant odor properties. Especially, L-lysine monohydrochloride is not inclined to decompose. Of course, its production is connected with additional material and process expense.

However, the use of L-lysine monohydrochloride for supplementing feeds and mixed feeds with L-lysine has the disadvantage that in common with the increase in content of L-lysine in the mixed feed, the content of chloride is also increased. Generally, this is not desired. Thus, the "National Research Council", for example, recommends for poultry feed a content of 0.08% chloride with a content of sodium of 0.15% and of potassium of 0.1 to 0.2% ("Nutrient Requirements of Poultry", Washington, D.C., 1977). The content of sodium, potassium, and chloride influences not only the acid-base equilibrium which through metabolic acidosis produced by increased chloride content leads to a depression of the rate of growth and feed consumption (Calvert, Poultry Science, Vol. 60, pages 1468–1472 (1981)) and also influences the Vitamin D- metabolism and the bone growth.

The ratio of lysine to chloride also plays a special role. According to Calvert, Poultry Science, Vol. 60, pages 1468–1472 (1981), e.g., the lysine-arginine antagonism which occurs especially in rations which are poor in arginine, is strengthened by increased chloride content. This leads to reduced feed intake and reduced growth. In feeding experiments with crystalline aminoacid diets, even the positive effect of the aminoacid addition is lost entirely if the aminoacids are employed as hydrochlorides and a chloride excess results (Proc. Nutr. Soc., Vol. 40, page 285 (1981)). For these reasons, a chloride free form of L-lysine for supplementing feeds and mixed feeds is very much desired.

SUMMARY OF THE INVENTION

It has now been found that the supplementation of feeds and mixed feeds with L-lysine that is unstable in free form also is possible if aqueous solutions of L-lysine are used for the supplementation. Surprisingly, these aqueous solutions are stable even with long storage and even at elevated temperatures. Comparison experiments have shown that a 70% L-lysine solution in water shows no colorations after six weeks storage at 50° C. The examination for byproducts which perhaps are formed proved negative. Crystallized L-lysine in contrast to the behavior of the dissolved product under these storage conditions showed clear coloration. Analytical investigations confirmed the formation of byproducts. This behavior is completely surprising, therefore, because according to common knowledge, products inclined to decompose are generally much more sensitive in dissolved form than in crystallized condition. The aqueous solutions of L-lysine compared to the crystallized L-lysine monohydrochloride besides have the advantage that they are easier to produce, the chloride content of the mixed feed is not increased, and even in small amounts, they can be exactly dosaged. As liquid formulations in the supplementation of mixed feeds with L-lysine, they do not require the otherwise for the most indispensable premixtures containing the lysine in correspondingly higher concentration. Rather, they can be homogeneously mixed in with the remaining components of the mixed feed already present in the desired concentration by spraying the lysine solution into a mixing chamber containing the other components.

Although L-lysine generally is considered not only as a substance but also in feeds and mixed feeds as one of the aminoacids which are first damaged with heat treatment (Prog. Food Nutr. Sci., Vol. 5, page 159 (1981)), the free L-lysine applied in the form of aqueous L-lysine solutions is surprisingly stable also in feeds and mixed feeds. Decomposition and/or reactions with other feed components do not occur. In feeding experiments, it was proven that the aqueous L-lysine solutions show the same effectiveness as L-lysine monohydrochloride, insofar as they are employed in equimolar amounts.

In order to obtain the improvements sought in regard to increase in weight and feed conversion, there must be added different amounts of L-lysine to the mixed feed in each case for supplementation of the natural L-lysine content of the feed protein. With the use of aqueous solutions of L-lysine according to the invention the amount is, depending on the concentration of the L-lysine in the solution, generally between 0.01 and 5 weight percent, based on the weight of the finished mixed feed. Especially suited thereby are solutions whose content of L-lysine is between 30 and 80 weight percent, preferably between 50 and 70 weight percent. Such solutions can be obtained in the simplest case by dissolving L-lysine in corresponding amounts of water. It goes without saying that it is simpler and more suitable in the industrial production of L-lysine to likewise work on aqueous solutions which contain the L-lysine in the desired concentration. This naturally simplifies the production and, especially also in comparison to the production of L-lysine monohydrochloride, saves costs.

Unless otherwise indicated, all parts and percentages are by weight.

The compositions can comprise, consist essentially of, or consist of the stated materials.

The invention is explained in more detail by the following examples.

DETAILED DESCRIPTION

Example 1

In a feeding experiment with fattened poultry, there were fed 900 animals of the breed Shaver Starboro divided into three groups while holding the base group under conditions approximating those in practice. The distribution of the chicks to the groups was carried out at the age of one day according to chance. The duration of the experiment was twenty-eight days. In order to investigate the effect of the aminoacid L-lysine, a control group received only the following base ration:

| Components | Portion in the Feed (Parts by Weight) |
| --- | --- |
| Corn | 40.60 |
| Soybean meal | 32.80 |
| Corn starch | 17.00 |
| Fatty feed | 5.30 |
| Calcium phosphate | 2.10 |
| Calcium carbonate | 0.35 |
| Sodium chloride | 0.25 |
| Methionine premixture | 1.00 |
| Cholin chloride | 0.10 |
| Trace elements | 0.10 |
| Coccidiostaticum | 0.10 |
| Vitamin premixture | 0.10 |

-continued

| Components | Portion in the Feed (Parts by Weight) |
| --- | --- |
| Antioxidant | 0.02 |
| Preservative | 0.05 |

For the test group 1, there was added to this base ration 0.095 parts by weight of L-lysine in the form of 0.12 parts by weight of L-lysine monohydrochloride; for the test group 2, 0.095 parts by weight of L-lysine in the form of 0.136 parts by weight of an aqueous L-lysine solution having a lysine content of 70 weight percent.

The results of the feeding experiments are collected in following Table 1 under the criteria weight increase and feed conversion.

TABLE 1

| Criteria | Control Group (Without L-Lysine Addition) | Test Group 1 (With L-Lysine Monohydrochloride) | Test Group 2 (With L-Lysine in Aqueous Solution) |
| --- | --- | --- | --- |
| Average body weight of the animals [g] | 971 | 1023 | 1027 |
| Average feed utilization [g feed/g body weight increase] | 1.53 | 1.45 | 1.44 |

Example 2

In a feeding experiment with fattened swine having a weight distribution of 23 to 45 kg living weight, there were individually fed 3 groups, each with 24 animals of the breed "Landrasse". In order to investigate the effect of the aminoacid L-lysine, a control group received only the following base ration:

| Components | Portion in the Feed (Parts by Weight) |
| --- | --- |
| Corn | 84.00 |
| Soybean meal | 12.00 |
| Animal bone meal | 2.00 |
| Calcium phosphate | 0.60 |
| Calcium carbonate | 0.60 |
| Trace elements | 0.50 |
| Vitamin premixture | 0.10 |

For test group 1, there was added to this base ration 0.14 parts by weight of L-lysine in the form of 0.18 parts by weight of L-lysine monohydrochloride; for test group 2, 0.14 parts by weight of L-lysine in the form of 0.28 parts by weight of an aqueous L-lysine solution having an L-lysine content of 50 weight percent.

In following Table 2, the results of the feeding experiments are collected under the criteria increase in weight and feed conversion:

TABLE 2

| Criteria | Control Group (Without L-Lysine Addition) | Test Group 1 (With L-Lysine Monohydrochloride) | Test Group 2 (With L-Lysine in Aqueous Solution) |
| --- | --- | --- | --- |
| Average body weight increase per animal [g/day] | 628 | 765 | 763 |
| Average feed utilization | 2.62 | 2.38 | 2.38 |

TABLE 2-continued

| Criteria | Control Group (Without L-Lysine Addition) | Test Group 1 (With L-Lysine Monohydrochloride) | Test Group 2 (With L-Lysine in Aqueous Solution) |
| --- | --- | --- | --- |
| [g feed/g body weight increase] | | | |

The feed experiments prove that L-lysine added to industrially produced feeds or mixed feeds on an equimolar basis in the form of aqueous L-lysine solutions has an equal L-lysine effect as L-lysine monohydrochloride. Overall, however, there result advantages through the use of aqueous L-lysine solution.

The L-lysine solutions of the invention can be used with feeds, e.g., solid feeds, for poultry, swine, cattle, sheep, and household animals such as dogs and cats.

The feed or mixed feed normally contains carbohydrate and protein and also contain a source of calcium, vitamins, trace elements, fat, etc. as in conventional feeds and mixed feeds.

The entire disclosure of German priority application P 3242501.5 is hereby incorporated by reference.

What is claimed is:

1. A method of supplementing feed with L-lysine without increasing the chloride content thereof, comprising the steps of:
   (a) providing a mixed fodder; and
   (b) supplementing said fodder with an effective amount sufficient to enhance the nutritional value thereof of an aqueous solution consisting essentially of free L-lysine in a concentration of between 30 and 80% by weight, whereby a supplemented fodder is produced.

2. A method according to claim 1, wherein said concentration is 50 to 70% by weight.

3. A method according to claim 1, wherein said effective amount is between 0.01-5% by weight of said supplemented fodder.

4. A method according to claim 1, further comprising the step of supplementing said fodder with calcium.

5. A method according to claim 1, wherein said feed is for poultry, swine, cattle or domestic animals.

6. A method according to claim 1, further comprising the step of heat treating said supplement feed, whereby a dry feed is produced.

7. A method according to claim 1, wherein said mixed fodder comprises at least one member selected from the group consisting of corn and soybeans.

8. A method according to claim 7, wherein said mixed fodder is free of meat.

9. A method according to claim 8, further comprising the step of supplementing said fodder with trace elements.

* * * * *